(12) United States Patent
Yagyu et al.

(10) Patent No.: US 9,083,077 B2
(45) Date of Patent: Jul. 14, 2015

(54) ANTENNA DEVICE

(75) Inventors: Makoto Yagyu, Aichi (JP); Masahiro Egashira, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 92 days.

(21) Appl. No.: 13/370,715

(22) Filed: Feb. 10, 2012

(65) Prior Publication Data

US 2012/0212381 A1    Aug. 23, 2012

(30) Foreign Application Priority Data

Feb. 21, 2011    (JP) .................................. 2011-034815

(51) Int. Cl.
*H01Q 1/06* (2006.01)
*H01Q 1/32* (2006.01)
*H01Q 7/00* (2006.01)
*B60R 25/20* (2013.01)
*B60Q 1/26* (2006.01)

(52) U.S. Cl.
CPC .......... *H01Q 1/3241* (2013.01); *B60R 25/2063* (2013.01); *H01Q 7/00* (2013.01); *B60Q 1/2669* (2013.01)

(58) Field of Classification Search
CPC ....................................................... H01Q 1/06
USPC ......................................................... 343/721
See application file for complete search history.

(56) References Cited

U.S. PATENT DOCUMENTS

| | | | |
|---|---|---|---|
| 5,729,057 A * | 3/1998 | Frenzel et al. | 307/10.3 |
| 2006/0214766 A1 * | 9/2006 | Ghabra et al. | 340/5.25 |
| 2007/0279300 A1 | 12/2007 | Schindler et al. | |
| 2009/0080058 A1 * | 3/2009 | Kothari et al. | 359/290 |
| 2010/0289619 A1 * | 11/2010 | Kosugi et al. | 340/5.61 |
| 2011/0007463 A1 * | 1/2011 | Hodges | 361/679.01 |
| 2011/0026095 A1 * | 2/2011 | Kothari et al. | 359/290 |

FOREIGN PATENT DOCUMENTS

| | | |
|---|---|---|
| CN | 1993256 | 7/2007 |
| CN | 101942931 A | 1/2011 |
| EP | 1071158 | 7/2002 |
| JP | 07-48910 | 11/1995 |
| JP | 2007-303171 | 11/2007 |
| JP | 2010-105530 | 5/2010 |

OTHER PUBLICATIONS

Search report from E.P.O., mail date is Aug. 2, 2012.
Japan Office action, mail date is Oct. 1, 2013.
China Office action, mail date is Apr. 1, 2014.

* cited by examiner

*Primary Examiner* — Dameon E Levi
*Assistant Examiner* — Andrea Lindgren Baltzell
(74) *Attorney, Agent, or Firm* — Greenblum & Bernstein, P.L.C.

(57) ABSTRACT

An antenna device includes an antenna that performs wireless communication with an electronic key. A substrate is connected to the antenna. A housing includes the antenna and the substrate. A cover is coupled to the housing to cover the substrate, which is exposed from the housing. The cover includes a part formed from a transparent material and facing at least part of the substrate.

8 Claims, 3 Drawing Sheets

ANTENNA DEVICE

CROSS-REFERENCE TO RELATED APPLICATIONS

This application is based upon and claims the benefit of priority from prior Japanese Patent Application No. 2011-034815, filed on Feb. 21, 2011, the entire contents of which are incorporated herein by reference.

BACKGROUND OF THE INVENTION

The present invention relates to an antenna device that performs wireless communication with an electronic key.

Immobilizer systems are installed in automobiles to prevent automobile theft by prohibiting starting of the engine. Japanese Laid-Open Patent Publication No. 2007-303171 describes such an immobilizer system. The immobilizer system of the publication includes a transponder arranged in an ignition key, a coil antenna arranged in a key cylinder, and a computer installed in a vehicle (steering column).

When a driver inserts the ignition key into the key cylinder device, the transponder of the ignition key transmits an ID code. The coil antenna in the key cylinder then receives the ID code from the transponder and transmits the ID code to the computer. The computer compares the received ID code with its ID code and permits starting of the engine when the two ID codes are in conformance. In this state, operation of the ignition key starts the engine.

The immobilizer system of each automobile has a unique ID code, which differs from those of other automobiles. Thus, the correct key cylinder, which incorporates electronic components, must be installed in each automobile. To prevent erroneous installation, a label or the like can be attached to the key cylinder. However, erroneous installation may occur not only when installing the key cylinder in an automobile but also when installing electronic components in the key cylinder device. Nevertheless, the installation of the correct electronic components cannot be determined from the outer appearance of the key cylinder device. In this regard, there is still room for improvements.

SUMMARY OF THE INVENTION

Accordingly, it is an object of the present invention to provide an antenna device that prevents erroneous installation.

One aspect of the present invention is an antenna device including an antenna that performs wireless communication with an electronic key. A substrate is connected to the antenna. A housing includes the antenna and the substrate. A cover is coupled to the housing to cover the substrate, which is exposed from the housing. The cover includes a part formed from a transparent material and facing at least part of the substrate.

In this structure, the substrate can be viewed through the transparent part of the cover. Thus, the color of the substrate or characters and numbers of a marking on the substrate regulated by law such as an approval number can be checked when assembling the antenna device or when coupling the assembled antenna device to a vehicle in a state in which the cover is coupled to the housing. This prevents erroneous installation of the antenna device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of an antenna device according to the present invention will now be described with reference to FIGS. 1 and 2. The antenna device is embodied in a key cylinder device 10.

[Structure of the Key Cylinder Device 10]

Figure 1:
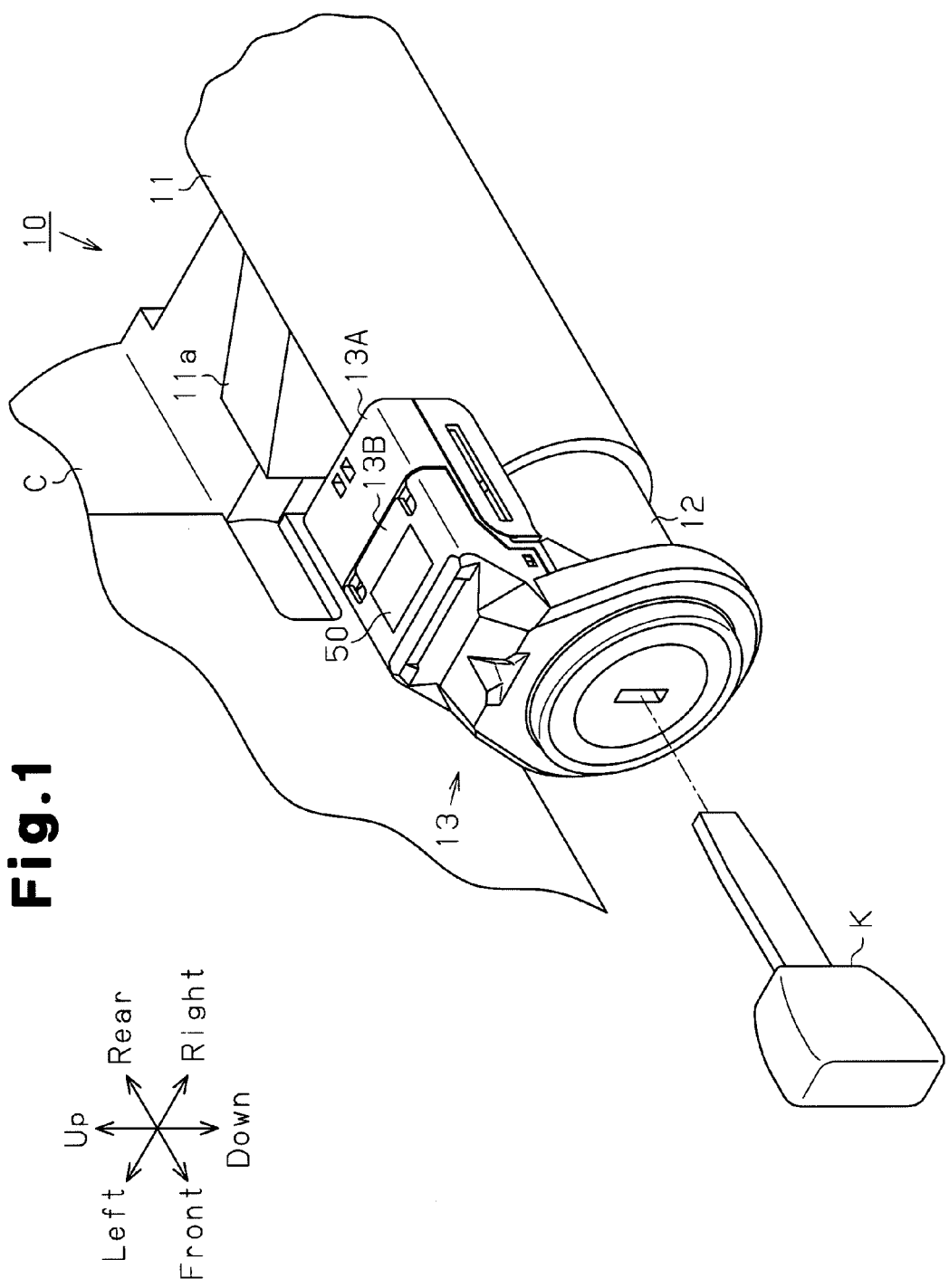
FIG. 1 is a perspective view showing a key cylinder device according to one embodiment of the present invention.

As shown in FIG. 1, the key cylinder device 10 includes a cylinder holder 11, a key cylinder body 12, which is fitted into the key cylinder holder 11, and a cover 13, which covers the key cylinder holder 11 and the key cylinder body 12. The key cylinder holder 11 is fixed by a coupling piece 11a to a steering column C of an automobile.

Figure 2:
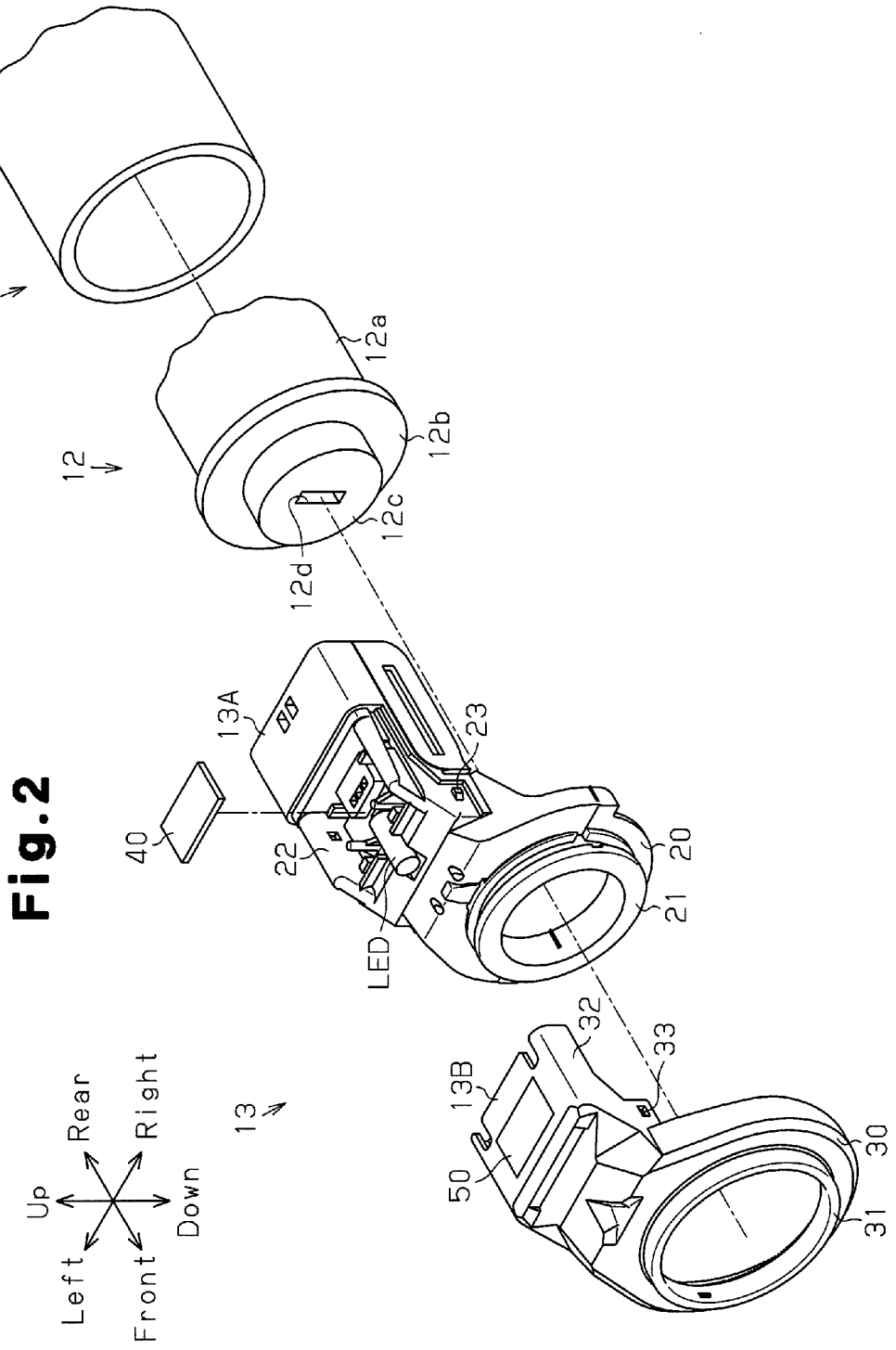
FIG. 2 is an exploded perspective view showing the key cylinder device of FIG. 1.

As shown in FIG. 2, the key cylinder body 12 includes a cylindrical sleeve 12a, and an annular flange 12b, which closes an opening of the sleeve 12a. The flange 12b has a diameter (outer diameter) that is slightly greater than a diameter (outer diameter) of the sleeve 12a. A keyway piece 12c, which is rotatable relative to the flange 12b, projects from a central portion of the flange 12b. The keyway piece 12c is coupled in an integrally rotatable manner to a rotor that is arranged in the sleeve 12a. The rotor starts and stops operation of an internal combustion engine, which serves as a drive source. The keyway piece 12c, which serves as an operation member, includes a keyway 12d for insertion of an ignition key K, which serves as an electronic key. The ignition key K is inserted into the keyway 12d and turned to synchronously rotate the rotor.

As shown in FIG. 1, the cover 13 includes a first cover 13A and a second cover 13B. The first cover 13A serves as a housing that covers an upper portion and front surface of the key cylinder body 12. The second cover 13B covers the first cover 13A from an outer side.

As shown in FIG. 2, the first cover 13A includes a first flange cover 20 and an antenna coil case 21, which is arranged on the front of the first flange cover 20. The first flange cover 20 is annular and covers the flange 12b while exposing a front surface of the keyway piece 12c, which includes the keyway 12d. The antenna coil case 21 is annular and extends around an opening of the first flange cover 20. The antenna coil case 21 includes a wound antenna coil, or antenna, which serves as an electronic device that performs wireless communication with an ignition key K (with a transponder arranged in the ignition key K). The first cover 13A includes a box-shaped electronic component compartment 22, which is arranged above the first flange cover 20 and extends in a direction opposite to the direction in which the antenna coil case 21 projects. A substrate 40 is arranged in the electronic component compartment 22. Various electronic elements, including an LED serving as a light source, are fixed and wired to the substrate 40. The antenna coil is electrically connected to the substrate 40. A rear surface (upper surface) of the substrate 40 includes a marking regulated by law such as an approval number required for a wireless authentication system. Tabs 23 are formed on left and right sides of the first cover 13A between the first flange cover 20 and the electronic component compartment 22. The first cover 13A is hooked by a hooking mechanism (not shown) to the key cylinder holder 11 and key cylinder body 12.

The second cover 13B is formed from a transparent material such as a transparent resin. The second cover 13B includes a second flange cover 30 and a cylindrical wall 31, which projects from the front of the second flange cover 30. The second flange cover 30 is annular and covers the first flange cover 20 while exposing the front surface of the keyway piece 12c, which includes the keyway 12d. The cylindrical wall 31 is formed around an opening of the second flange cover 30. The cylindrical wall 31 is projected for an amount that is set so that a front end of the cylindrical wall 31 is flush with a front end of the antenna coil case 21 when the second cover 13B is coupled to the first cover 13A. The second flange cover 30 acts as a light guide that guides light from the LED serving as the light source arranged in the first cover 13A (or on the substrate 40). The second cover 13B includes a planar electronic component compartment cover 32, which is arranged above the second flange cover 30 and extends in the direction opposite to the direction in which the antenna coil case 21 projects. The electronic component compartment cover 32 includes a convex lens 50. Further, hooking holes 33 are formed in the left and right sides of the second cover 13B between the second flange cover 30 and the electronic component compartment cover 32. The second cover 13B is coupled to the first cover 13A with the second flange cover 30 arranged in correspondence with the first flange cover 20 and the electronic component compartment cover 32 arranged in correspondence with the electronic component compartment 22. This hooks the tabs 23 to the hooking holes 33 and fastens the second cover 13B to the first cover 13A. In this state, the second flange cover 30 covers the first flange cover 20, the cylindrical wall 31 covers the antenna coil case 21, and the electronic component compartment cover 32 covers the electronic component compartment 22. Further, the convex lens 50 is arranged facing the substrate 40. In the present embodiment, the second flange cover 30, the cylindrical wall 31, and the electronic component compartment cover 32 are formed integrally with one another.

[Operation of the Key Cylinder Device 10]

The operation of the key cylinder device 10 will now be described.

The second cover 13B is formed from a transparent resin material. Thus, in a state in which the second cover 13B is coupled to the first cover 13A, various electronic components and the like in the first cover 13A can be viewed. More specifically, the color of the substrate 40 or characters and numbers of a marking on the substrate 40 regulated by law such as an approval number required for a wireless authentication system can be checked when assembling the key cylinder device 10 and coupling the key cylinder device 10 to the steering column C. This prevents erroneous installation of the key cylinder device 10 in the vehicle.

The electronic component compartment cover 32, which covers the electronic component compartment 22 accommodating the substrate 40, includes the convex lens 50. Accordingly, the characters and numbers on the substrate 40 are viewed through the convex lens 50. This magnifies the viewed characters and the like and allows for easy reading of the marked information. In other words, even if the characters and numbers on the substrate are small, the characters and numbers can easily be read. Thus, the amount of information marked on the substrate 40 can be increased.

The key cylinder device 10 of the present embodiment has the advantages described below.

(1) The second cover 13B is formed from a transparent resin material. Thus, characters and numbers of a marking on the substrate 40 can be checked when assembling the key cylinder device 10 and coupling the key cylinder device 10 to the steering column C. This prevents erroneous installation of the key cylinder device 10 in the vehicle.

(2) The second cover 13B includes the convex lens 50, which is arranged on the electronic component compartment cover 32. Thus, the characters and numbers marked on the substrate 40 can be read even when they are small. This allows for the amount of information marked on the substrate 40 to be increased. Further, this structure eliminates the need to attach an authentication label or the like to the outer side of the key cylinder device 10.

(3) The second flange cover 30, cylindrical wall 31, and electronic component compartment cover 32 are formed integrally with one another. This reduces the number of components and the number of coupling steps in the key cylinder device 10.

It should be apparent to those skilled in the art that the present invention may be embodied in many other specific forms without departing from the spirit or scope of the invention. Particularly, it should be understood that the present invention may be embodied in the following forms.

Figure 3:
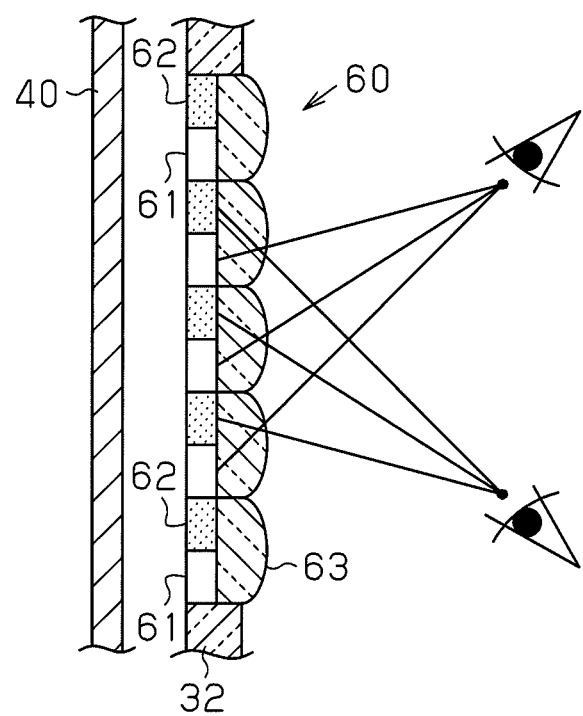
FIG. 3 is a side view showing a modification of the key cylinder device.

In the above embodiment, a lenticular print 60 may be used in lieu of the convex lens 50. As shown in FIG. 3, the lenticular print 60 includes a lenticular image and a lenticular lens 63. The lenticular image is a combination of two or more raw images (e.g., two raw images 61 and 62 in FIG. 3). The lenticular lens 63 is arranged on the lenticular image on a surface facing away from the substrate 40. Each of the raw images 61 and 62 is sliced into strips. Then, the strips of the raw images 61 and 62 are interlaced to form the lenticular image. The lenticular lens 63 is formed by an array of fine elongated convex lenses. The raw image 61 is a transparent image, and the raw image 62 is an information image including characters and numbers. This structure allows for one of the two raw images 61 and 62 to be viewed depending on the angle at which the lenticular lens 63 is viewed. When the raw image 61 of the lenticular image can be viewed, the transparent raw image 61 allows for the substrate 40 to be checked. When the raw image 62 can be viewed, the information on the raw image 62 can be checked. Accordingly, when using the lenticular print 60 in lieu of the convex lens 50, more information can be included in the same region. The lenticular image can be formed by combining three or more raw images. In this case, one of the three or more raw images forms a transparent image.

The above embodiment does not have to include the convex lens 50. Even in such a structure, the color of the substrate 40 and the characters and numbers of a marking on the substrate 40 can be checked when assembling the key cylinder device 10. This prevents erroneous installation of the key cylinder device 10.

In the above embodiment, the second cover 13B does not necessarily have to be entirely formed from a transparent material as long as at least the electronic component compartment cover 32 is formed from a transparent material. Even in such a structure, the color of the substrate 40 and the characters and numbers of a marking on the substrate 40 can be checked when assembling the key cylinder device 10. This prevents erroneous installation of the key cylinder device 10. Further, only a portion of the electronic component compartment cover 32 corresponding to the substrate 40 may be transparent. Moreover, only a portion of the electronic component compartment cover 32 corresponding to part of the substrate 40 may be transparent. Even in such structures, more information such as the color of the substrate 40 can be obtained as compared with when the substrate cannot be viewed at all from the outer side.

In the above embodiment, the first cover 13A includes the antenna coil case 21 and the electronic component compartment 22. However, the antenna coil case 21 and electronic component compartment 22 do not necessarily have to be formed integrally with the first cover 13A. That is, the antenna coil case 21 may be discrete from the electronic component compartment 22. In this case, it is only required that the member covering the electronic component compartment 22 be formed from a transparent resin material. Even in such a structure, the color of the substrate 40 and the characters and numbers of a marking on the substrate 40 can be checked when assembling the key cylinder device 10. This prevents erroneous installation of the key cylinder device 10.

In the above embodiment, the second flange cover 30 may be discrete from the electronic component compartment cover 32. In this case, the electronic component compartment cover corresponds to a second cover. Such a structure obtains the same advantages as the above embodiment.

In the key cylinder device 10 of the above embodiment, the ignition key K is inserted into the keyway 12d to turn the keyway piece 12c and start the engine. However, the key cylinder device 10 is not limited to such a structure. For example, the present invention may be applied to a starting device that starts the engine when a switch is operated (pushed or turned) in a state in which electronic authentication of the electronic key and the vehicle is accomplished. This obtains the same advantages as the above embodiment.

In the above embodiment, the drive source installed in the vehicle is an internal combustion engine. Instead, the drive source may be a motor for an electric vehicle or a motor and engine for a hybrid vehicle.

In the above embodiment, the first cover 13A, which serves as the housing, may also be formed from a transparent resin material such as the second cover 13B. Such a structure allows for the substrate 40 to be viewed through the first cover 13A. In this case, the substrate 40 can be viewed more easily than when the first cover 13A is not formed from a transparent material. This further prevents erroneous installation of the key cylinder device 10.

In the above embodiment, the antenna device is applied to a key cylinder device but may be applied to another device. For example, the present invention may be applied to a door antenna device that is arranged in a vehicle door and performs wireless communication with an electronic key. Such a structure allows for configuration of a system that switches the vehicle doors between locked and unlocked states through wireless communication. Further, the antenna device does not have to be used in a vehicle. For example, the present invention may be embodied in an antenna device arranged near a household door to switch the door between locked and unlocked states through wireless communication.

The present examples and embodiments are to be considered as illustrative and not restrictive, and the invention is not to be limited to the details given herein, but may be modified within the scope and equivalence of the appended claims.

The invention claimed is:

1. An electronic key authentication device in a vehicle or a household for use with an electronic key, comprising:
    a housing that includes an electronic component compartment having a top opening;
    a cover that covers the housing from an outer side;
    an antenna fixed to the housing and configured to communicate wirelessly with the electronic key; and
    a substrate arranged in the electronic component compartment and electrically connected to the antenna, wherein the substrate is configured to perform electronic authentication of the electronic key through wireless communication,
    wherein the cover includes a transparent part arranged at a position facing a marked information on the substrate and covering the top opening of the electronic component compartment for allowing to check the marked information of the substrate through the transparent part, and
    wherein the marked information of the substrate includes information that is unique to the electronic key authentication device for determining whether installation of the electronic key authentication device in the vehicle or the household is correct or not.

2. The electronic key authentication device according to claim 1, further comprising a light source arranged in the housing or on the substrate, wherein the cover functions as a light guide that guides light from the light source.

3. The electronic key authentication device according to claim 1, further comprising a convex lens formed at the transparent part of the cover facing the substrate.

4. The electronic key authentication device according to claim 1, further comprising a lenticular print arranged at the transparent part of the cover facing the substrate, wherein the lenticular print includes:
    a lenticular lens; and
    a lenticular image arranged between the lenticular lens and the substrate, wherein the lenticular image is formed by slicing two or more raw images into strips and arranging the sliced strips of the raw images in an interlaced state, and
    one of the two or more raw images is a transparent image.

5. The electronic key authentication device according to claim 1,
    wherein the marked information of the substrate includes a specific color or is provided with characters and numbers.

6. The electronic key authentication device according to claim 1,
    wherein
    the electronic key authentication device is a key cylinder device in the vehicle for use with the electronic key, and
    the key cylinder device includes a key cylinder body for insertion of the electronic key.

7. The electronic key authentication device according to claim 1,
    wherein
    the electronic key authentication device is an engine starting device in the vehicle for use with the electronic key, and
    the engine starting device includes a user-operable switch and is configured to start an engine when the switch is operated by being pushed or turned in a state in which electronic authentication of the electronic key and the vehicle is accomplished.

8. The electronic key authentication device according to claim 1,
    wherein
    the electronic key authentication device is a door antenna device arranged in a vehicle door or a household door for use with the electronic key, and the door antenna device is configured to switch the vehicle door or the household door between locked and unlocked states through wireless communication with the electronic key.

* * * * *